3,492,309
SYNTHESIS OF ALPHA METAL-FREE PHTHALOCYANINE

Oliver A. Ossanna, Bloomington, Minn., assignor to Xerox Corporation, Rochester, N.Y., a corporation of New York
No Drawing. Filed Apr. 21, 1967, Ser. No. 632,569
Int. Cl. C09b 47/02; C07d 27/74
U.S. Cl. 260—314.5          5 Claims

ABSTRACT OF THE DISCLOSURE

A process for the preparation of alpha metal-free phthalocyanine (substituted or unsubstituted) which comprises mixing under reaction conditions a labile metal phthalocyanine and carbon dioxide.

---

This invention relates, in general, to a novel process for the preparation of an organic pigment and, in particular, to a process for the preparation of phthalocyanine. More specifically, the invention relates to a process for the preparation of alpha metal-free phthalocyanine.

Phthalocyanine, which is also known as tetrabenzotetraazaporphin and tetrabenzoporphyrazine, may be said to be the condensation product of four isoindole groups. Metal-free phthalocyanine has the following structure:

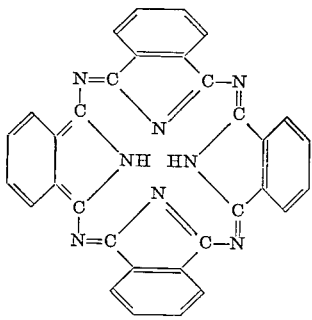

In addition to the metal-free phthalocyanine of the above structure, various metal derivates of phthalocyanine are known in which the two hydrogen atoms in the center of the molecule are replaced by metals from any group of the periodic table. Also, it is well known that from one to sixteen of the peripheral hydrogen atoms in the four benzene rings of the phthalocyanine molecule may be replaced by halogen atoms and by numerous organic and inorganic groups.

Metal-free phthalocyanine is known to exist in at least four polymorphic forms, including alpha, beta, gamma, and "X-form." X-form is a newly discovered polymorphic form of phthalocyanine which has been shown to have unique xerographic properties. X-form is further discussed in a copending application, Ser. No. 375,191, filed in the United States Patent Office on June 15, 1964. The various forms of metal-free phthalocyanine may easily be distinguished by comparison of their X-ray diffraction patterns and/or infrared spectra (see copending application, Ser. No. 505,723, filed in the United States Patent office on Oct. 29, 1965).

The alpha form of phthalocyanine has several important uses. For example, it has been found to be commercially useful in plastic, ink, and paint applications. Further, it is known that alpha phthalocyanine may be used in conjunction with X-form phthalocyanine as a photoconductive material in xerography. In addition, it is known that the alpha form of phthalocyanine may be converted to the X-form by any suitable grinding process, such as ball milling or salt milling.

In the preparation of alpha metal-free phthalocyanine for xerographic purposes or for further conversion to X-form metal-free phthalocyanine, many difficulties have been encountered. The use of metal-free phthalocyanine in xerographic applications places stringent requirements on the purity of this material. It is required that the phthalocyanine intended for use in a xerographic plate generally be free of impurities or contaminates which in one way or another interfere with the xerographic system, whether it be in the charge acceptance or charge dissipation step or other steps in the electrographic system. Until now, phthalocyanine has been prepared almost exclusively for use as a pigment, where color, tinctorial strength, light fastness, dispersibility, etc. are prime considerations and purity is incidental. As a result, reported methods of synthesis (see "Phthalocyanine Compounds" by Moser and Thomas, Rheinhold Publishing Company, pages 104–189) often introduce metals or other complex organic materials as impurities which are difficult to remove. Two general methods have been used for the manufacture of phthalocyanine: (1) indirectly from an acid and a metal phthalocyanine containing a replaceable metal and (2) directly from phthalonitrile.

Methods that include forming a metal phthalocyanine with a replaceable metal which is subsequently removed with an acid are heating phthalonitrile with a sodium alcoholate (U.S. Patent 2,116,602), heating phthalonitrile with sodium cyanamide (U.S. Patent 2,154,912), heating phthalonitrile with sodium cyanamide and a solvent (U.S. Patent 2,182,763), heating phthalonitrile with calcium metal in an alcohol or with calcium or barium oxides (U.S. Patent 2,202,632), heating phthalonitrile with calcium oxide and methylglucamine (U.S. Patent 2,413,191), heating phthalonitrile with alcohol and sodium hydride (German Patent 933,047), heating phthalonitrile with magnesium and a solvent under pressure (British Patent 466,042). Other methods for making labile metal phthalocyanines include those of Linstead's and Thorpe's early patents (e.g., U.S. Patent 2,000,051), using cyanobenzamide or phthalamide as the phthalocyanine forming intermediate and magnesium metal. A magnesium phthalocyanine is apparently formed by the action of a Grignard reagent such as methyl magnesium iodide with phthalonitrile. Tin phthalocyanine may be prepared by an urea-phthalic anhydride solvent process, but without ammonium chloride (U.S. Patent 2,197,459).

The above-mentioned methods of synthesis generally introduce metals which are difficult to remove. Methods of removing metal from labile phthalocyanines include: placing a solution of metal phthalocyanine in concentrated sulfuric acid, followed by drowning in water (U.S. Patent 2,197,459), boiling an alkali or alkali earth metal phthalocyanine with hydrochloric acid (U.S. Patent 2,216,761), or stirring an alkali metal phtholocyanine with cold methyl alcohol, diluting with warm water, and filtering (U.S. Patent 2,214,454). Heating an alkali metal phthalocyanine with the ammonium salt of a strong acid converts it to beta metal-free phthalocyanine (U.S. Patent 2,686,184).

One general method of preparing phthalocyanine which may avoid substantial metallic contaminants is to heat phthalonitrile to 350°– 360° C. for 7 hours in a sealed vessel (U.S. Patent 2,116,602). A second method of synthesis which may avoid substantial metallic contaminants is to heat phthalonitrile in dimethylaniline or in quinoline solution while passing gaseous ammonia through the solution; temperatures are maintained in the vicinity of 250° C. (U.S. Patent 2,116,602). A third method of synthesis which may avoid substantial metallic contaminants is to heat phthalonitrile with acetamide and/or formamide to the boil for 8 hours (U.S. Patent 2,182,763). A fourth method is to heat phthalonitrile with dihydroxybenzene, glycol, or glycerin (British Patent 466,042). A fifth method method consists of heating phthalonitrile in an inert solvent in the presence of cyclohexylamine or piperidine (U.S. Patent 2,485,167). A sixth method is to heat phthalonitrile in a solvent with potassium carbonate, piperidine, and ethylene glycol (U.S. Patent 2,485,167). Finally, a seventh method of synthesis of phthalocyanine which may avoid substantial metallic contaminants is to add a catalytic amount of triethanolamine to molten phthalonitrile at temperatures of 170° to 180° C. (U.S. Patent 2,155,054).

While the above seven methods of phthalocyanine synthesis avoid the introduction of metallic impurities, side reactions occur with a resulting lower yield of pigment due to the high temperatures at which these methods of synthesis are carried out. In addition, complex organic impurities are introduced. These organic impurities are difficult to remove and cannot be tolerated in the phthalocyanine compound when it is to be used for xerographic purposes.

Beta phthalocyanine may be converted to the alpha form by dissolving it in 98% sulfuric acid solution and precipitating the solution in ice water. However, sulfuric acid tends to degrade phthalocyanine resulting in the formation of phthalimide, phthalic acid, and various nitrogen containing compounds which are intolerable in a xerographic system. Furthermore, since it is difficult to extract the sulfuric acid from the reprecipitated phthalocyanine, it is probably that there is a continuous degradation of the phthalocyanine due to residual acid.

Conventional methods of preparing alpha metal-free phthalocyanine for paint, plastic and ink application (see "Phthalocyanine Compounds" by F. Moser and A. Thomas, Rheinhold Publishing Company, pages 104–191) have proved to be relatively expensive. In addition, it has been shown that considerable difficulty is encountered when attempting to isolate and purify the resulting product.

It is, therefore, an object of this invention to provide a method for the production of alpha metal-free phthalocyanine devoid of the above-noted disadvantages.

It is another object of this invention to provide a method for the preparation of alpha metal-free phthalocyanine whereby substantially all metals and other contaminates in the final product are avoided.

It is still another object of this invention to provide a method of synthesis of alpha metal-free phthalocyanine in which the final product is free of undesirable sulfuric acid contamination and decomposition products.

It is another object of this invention to provide a method for the preparation of alpha metal-free phthalocyanine whereby the yield or phthalocyanine is significantly improved.

It is still a further object of this invention to provide a method for the preparation of alpha metal-free phthalocyanine which takes place under mild reaction conditions.

It is yet another object of this invention to provide a method of synthesis of alpha metal-free phthalocyanine in which there is ease of isolation and purification of the resulting product.

It is still another object of this invention to provide a commercially useful method for the preparation of alpha metal-free phthalocyanine whereby the final product, when used in conjunction with X-form phthalocyanine, has excellent properties for use in a xerographic system.

It is yet another object of this invention to provide a method for the preparation of substantially pure alpha metal-free phthalocyanine, whereby the final product can be converted to X-form phthalocyanine for use in a xerographic system.

It is yet another further object of this invention to provide a simple, quick, and non-destructive method of converting the beta form of metal-free phthalocyanine to the alpha form.

It is still another object of this invention to provide a method of converting the beta form of metal-free phthalocyanine to the alpha form, obtaining substantially a 100% yield.

It is still another further object of this invention to provide a less costly method for the preparation of alpha metal-free phthalocyanine.

The foregoing objectives, and others, are accomplished in accordance with this invention, generally speaking, by providing a novel system for the preparation of alpha metal-free phthalocyanine, substituted or unsubstituted, which comprises mixing under reaction conditions and at any suitable temperature a labile metal phthalocyanine and carbon dioxide. Any conventional method of preparing the labile metal phthalocyanine may be employed.

While any labile metal phthalocyanine, such as an alkali metal phthalocyanine, an alkaline earth metal phthalocyanine, among other labile metal phthalocyanines, may be used, it is preferred that an alkali metal phthalocyanine be employed. Alkali metals have a single electron in the outermost shell. Since this electron is far removed from the nucleus of the atom, it is easily lost. Therefore, from the chemical point of view, these elements are the most active metals in the periodic table. In addition, alkali metals form the most ionic hydrides which in turn form the most ionic metal phthalocyanines. Optimum results are obtained with lithium phthalocyanine since lithium, in the free state, has the highest electromotive force of all alkali metals.

Although the carbon dioxide employed in this process may exist in any state, it is preferred to use it in the gaseous state. By employing gaseous $CO_2$, in contrast to solid $CO_2$, the operations involved are simplified. Further, 'a more efficient use of the carbon dioxide is made, resulting in a more economical process.

The following examples will further define various preferred embodiments of the present invention. Parts and percentages are by weight unless otherwise specified.

EXAMPLE I

A 2 liter, 4-neck flask is fitted wih a thermometer, mechanical stirrer, condenser, and gas inlet tube. Approximately 750 ml. of 2-ethoxyethanol are added, and the flask is flushed with nitrogen in order to remove water vapor. The stirred solvent is cooled to approximately 10° C. Approximately 1.25 moles of LiH are added cautiously. Approximately 1 mole of phthalonitrile is added to the vigorously stirred mixture. The suspension is heated to reflux and heating is continued for about 3 hours. The hot solution is filtered and $CO_2$ gas is then bubbled through the solution for approximately 3 hours. A jelly-like suspension of phthalocyanine in 2-ethoxyethanol is formed. This suspension is washed thoroughly with cold 10% aqueous HCl, water, and methanol and air-dried. The resulting product consists of extremely pure alpha metal-free phthalocyanine.

EXAMPLE II

A 2 liter, 4-neck flask is fitted wih a thermometer, mechanical stirrer, condenser, and gas inlet tube. Approximately 800 ml. of 2-butoxyethanol are aded, and the flask is flushed with argon in order to remove water vapor. The stirred solvent is cooled to approximately 20° C. Approximately 1.3 moles of KH are added very cautiously. (KH and NaH are supplied as a dispersion or suspension in oil and must be washed with ethyl ether or petroleum ether before being used. This should be done under dry $N_2$ when working with KH since this hydride is extremely reactive.) Approximately 1 mole of phthalamide is added to the vigorously stirred mixture. The suspension is heated to reflux and heating is continued for about 2 hours. The hot solution is filtered, cooled to about room temperature, and poured onto approximately 3 pounds of crushed solid $CO_2$. After the Dry Ice is consumed, a jelly-like suspension of phthalocyanine in 2-butyoxyethanol is formed.

This is diluted with ethanol, filtered, washed with water, acetone and methanol and dried in a vacuum oven for about 6 hours at 100° C. The resulting product consists of extremely pure alpha metal-free phthalocyanine.

EXAMPLE III

A 2 liter, 4-neck flask is fitted with a thermometer, mechanical stirrer, condenser, and gas inlet tube. Approximately 750 ml. of 1,3-propylene glycol are added, and the flask is flushed with argon in order to remove water vapor. The stirred solvent is cooled to approximately 5° C. Approximately 1.25 moles of NaH, free of oil, are added cautiously. Approximately 1 mole of phthalimide is added to the vigorously stirred mixture. The suspension is heated to reflux and heating is continued for about 5 hours. The hot solution is filtered, cooled to about room temperature, and poured onto approximately 6 pounds of crushed solid $CO_2$. After the Dry Ice is consumed, a jelly-like suspension of phthalocyanine in 1,3-propylene glycol is formed. This is diluted with water, filtered, washed with water and methanol, and dried in a vacuum oven for about 3 hours at 115° C. The resulting product consists of extremely pure alpha metal-free phthalocyanine.

EXAMPLE IV

A 2 liter, 4-neck flask is fitted with a thermometer, mechanical stirrer, condenser, and gas inlet tube. Approximately 780 ml. of 2-(2-methoxyethoxy) ethanol are added, and the flask is flushed with nitrogen in order to remove water vapor. The stirred solvent is cooled to approximately 10° C. Approximately 1.25 moles of $CdH_2$ are added cautiously. Approximately 1 mole of o-cyanobenzamide is added to the vigorously stirred mixture. The suspension is heated to reflux and heating is continued for about 4 hours. The hot solution is filtered, then cooled to about room temperature, and poured onto approximately 4 pounds of crushed solid $CO_2$. After the Dry Ice is consumed, a jelly-like suspension of phthalocyanine in 2-(2-methoxyethoxy) ethanol is formed. This is diluted with ethanol, filtered, washed with acetone and methanol, and dried in a vacuum oven for about 7 hours at 110° C. The resulting product consists of extremely pure metal-free phthalocyanine.

EXAMPLE V

A 2 liter, 4-neck flask is fitted with a thermometer, mechanical stirrer, condenser, and gas inlet tube. Approximately 750 ml. of 2-ethoxyethanol are added, and the flask is flushed with argon in order to remove water vapor. The stirred solvent is cooled to approximately 20° C. Approximately 1.3 moles of $ZnH_2$ are added cautiously. Approximately 1 mole of beta phthalocyanine is added to the vigorously stirred mixture. The suspension is heated to reflux and heating is continued for about 3 hours. The hot solution is filtered, then cooled to about room temperature, and pured onto approximately 6 pounds of crushed solid $CO_2$. After the Dry Ice is consumed, a jelly-like suspension of phthalocyanine in 2-ethoxyethanol is formed. This is diluted with water and methanol, filtered, washed with acetone, and dried in a vacuum oven for about 6 hours at 105° C. The resulting product consists of extremely pure alpha metal-free phthalocyanine.

EXAMPLE VI

A 2 liter, 4-neck flask is fitted with a thermometer, mechanical stirrer, condenser, and gas inlet tube. Approximately 760 ml. of 2-methoxyethanol are added, and the flask is flushed with nitrogen in order to remove water vapor. The stirred solvent is cooled to approximately 10° C. Approximately 1.25 moles of $CaH_2$ are added cautiously. Approximately 1 mole of 4-amino phthalonitrile is added to the vigorously stirred mixture. The suspension is heated to reflux and heating is continued for about 6 hours. The hot solution is then filtered, cooled to about room temperature, and poured onto approximately 4 pounds of crushed solid $CO_2$. After the Dry Ice is consumed, a jelly-like suspension of phthalocyanine in 2-methoxyethanol is formed. This is diluted with water and sumed, a jelly-like suspension of phthalocyanine in 2-ethanol, filtered, washed with dilute HCl and methanol and dried in a vacuum oven for about 4 hours at 110° C. The resulting product consists of extremely pure tetra-(4) amino phthalocyanine.

EXAMPLE VII

A 2 liter, 4-neck flask is fitted with a thermometer, mechanical stirrer, condenser, and gas inlet tube. Approximately 750 ml. of 2-iso-propoxyethanol are added, and the flask is flushed with argon in order to remove water vapor. The stirred solvent is cooled to approximately 15° C. Approximately 1.25 moles of KH, oil free, are added cautiously. Approximately 1 mole of 4-nitrophthalonitrile is added to the vigorously stirred mixture. The suspension is heated to reflux and heating is continued for about 2 hours. The hot solution is then filtered, cooled to about room temperature, and poured onto approximately 5 pounds of crushed solid $CO_2$. After the Dry Ice is consumed, a jelly-like suspension of pthalocyanine in 2-iso-propoxyethanol is formed. This is diluted with acetone, filtered, washed with water and methanol and dried in a vacuum oven for about 3 hours at 120° C. The resulting product consists of extremely pure tetra-(4) nitrophthalocyanine.

EXAMPLE VIII

A 5 liter, 4-neck flask is fitted with a thermometer, mecahical stirrer, condenser, and gas inlet tube. Approximately 750 ml. of 1,3-butylene glycol are added, and the flask is flushed with argon in order to remove water vapor. The stirred solvent is cooled to approximately 5° C. Approximately 1.25 moles of NaH, oil free, are added cautiously. Approximately 1 mole of phthalonitrile is added to the vigorously stirred mixture. The suspension is heated to reflux and heating is continued for about 4 hours. The hot solution is filtered, cooled, and poured onto approximately 7 pounds of crushed solid $CO_2$. After the Dry Ice is consumed, a jelly-like suspension of phthalocyanine in 1,3-butylene glycol is formed. This is diluted with methanol, filtered, washed with water, acetone and dried with methanol. The resulting product consists of extremely pure alpha metal-free phthalocyanine.

EXAMPLE IX

A 2 liter, 4-neck flask is fitted with a thermometer, mechanical stirrer, condenser, and gas inlet tube. Approximately 800 ml. of 2-ethoxyethanol are added, and the flask is flushed with nitrogen in order to remove water vapor. The stirred solvent is cooled to approximately 10° C. Approximately 1.25 moles of LiH are added cautiously. Approximately 1 mole of phthalamide is added to the vigorously stirred mixture. The suspension is heated to reflux and heating is continued for about 3 hours. The hot solution is then filtered, cooled to about room temperature, and poured onto approximately 5 pounds of crushed solid $CO_2$. After the Dry Ice is consumed, a jelly-like suspension of phthalocyanine in 2-ethoxyethanol is formed. This is diluted with methanol, filtered, washed with water, 10% aqueous HCl, acetone and methanol, and dried in a vacuum oven for about 5 hours at about 110° C. The resulting product consists of extremely pure alpha metal-free phthalocyanine.

EXAMPLE X

A 2 liter, 3-neck flask is fitted with a thermometer, stirrer, condenser, and gas inlet tube. Approximately 770 ml. of 2-butyoxyethanol are added, and the flask is flushed with nitrogen in order to remove water vapor. The stirred solvent is cooled to about 20° C. Approximately 1.25 moles of $CaH_2$ are added cautiously. Approximately 1 mole of 4-pyridylphthalonitrile is added to the vigorously stirred mixture. The suspension is heated to reflux and heating is continued for about 5 hours. The hot solution is filtered and $CO_2$ gas is then bubbled through the solution for approximately 7 hours. A jelly-like suspension of tetra-(4)-pyridylphthalocyanine in 2-butyoxyethanol is formed. This suspension is diluted with water, filtered, washed with dilute aqueous HCl, acetaone, and dried with methanol. The resulting product consists of extremely pure tetra-(4)-pyridylphthalocyanine.

EXAMPLE XI

A 5 liter, 4-neck flask is fitted with a thermometer, mechanical stirrer, condenser, and gas inlet tube. Approximately 750 ml. of 1,3-propylene glycol are added and the flask is flushed with nitrogen in order to remove water vapor. The stirred solvent is cooled to about 10° C. Approximately 0.50 mole of LiH and approximately 0.75 mole of NaH, free of oil, are added cautiously. Approximately 1 mole of phthalonitrile is added to the vigorously stirred mixture. The suspension is heated to reflux and heating is continued for about 4 hours. The hot solution is filtered and $CO_2$ gas is then bubbled through the solution for approximately 6 hours. A jelly-like suspension of phthalocyanine in 1,3-propylene glycol is formed. This suspension is washed with 10% aqueous acetic acid, water, acetone, and methanol and is dried in a vacuum oven for about 4 hours at about 115° C. The resulting product consists of extremely pure alpha metal-free phthalocyanine.

While specific components of the present system are defined in the working examples above, any other typical materials may be substituted in the working examples if appropriate. In adition, many other variables may be introduced in the present process such as further purification steps or other reaction components which may in any way affect, enhance, or otherwise improve the present process.

While various specifics are given in the present application, many modifications and ramifications will occur to those skilled in the art upon a reading of the present disclosure.

What is claimed is:

1. The process for the preparation of a member selected from the group consisting of alpha metal-free phthalocyanine or substituted phthalocyanine which comprises: mixing in a liquid medium a member selected from the group consisting of labile metal phthalocyanine or substituted phthalocyanine and carbon dioxide.

2. The process according to claim 1 in which the metal phthalocyanine is selected from the group consisting of alkali metal phthalocyanine, alkaline earth metal phthalocyanine, and mixtures thereof.

3. The process according to claim 1 in which the metal phthalocyanine is selected from the group consisting of lithium phthalocyanine, potassium phthalocyanine, sodium phthalocyanine and mixture thereof.

4. The process according to claim 1 in which the carbon dioxide employed exists in the gaseous state.

5. The process according to claim 1 in which the metal phthalocyanine is lithium phthalocyanine.

References Cited

FOREIGN PATENTS 712,455    1954    Great Britain.

HENRY R. JILES, Primary Examiner

H. I. MOATZ, Assistant Examiner

U.S. Cl. X.R.

260—296